S. H. CAMPBELL.
ATTACHMENT FOR PIN LIFTERS.
APPLICATION FILED OCT. 15, 1919.
1,387,684.  Patented Aug. 16, 1921.
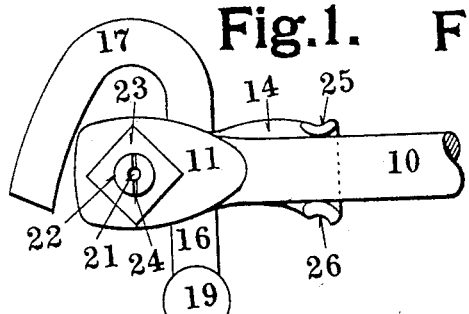
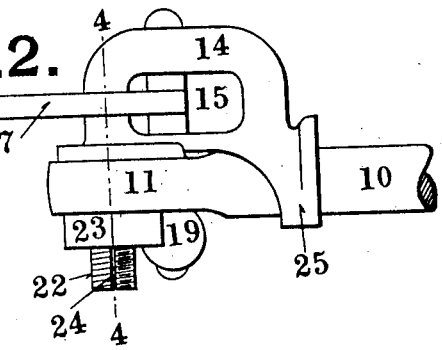
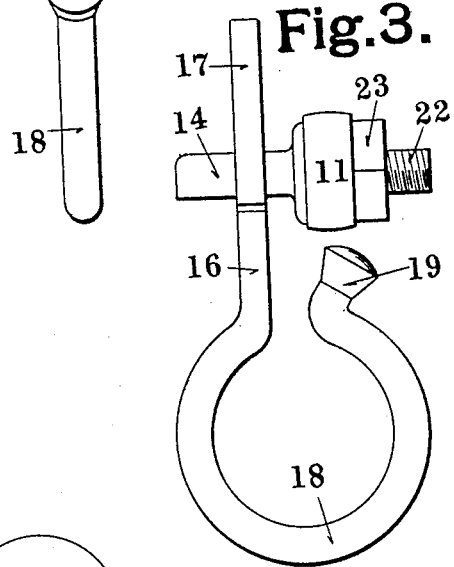
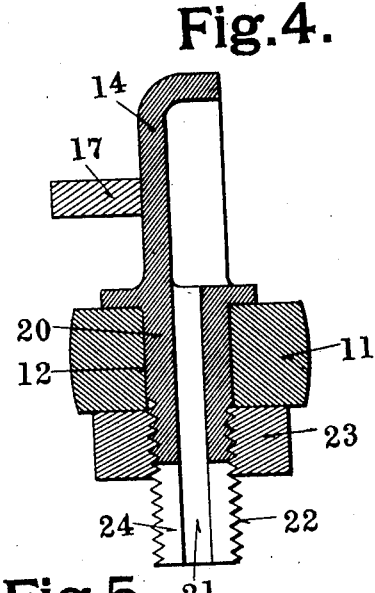
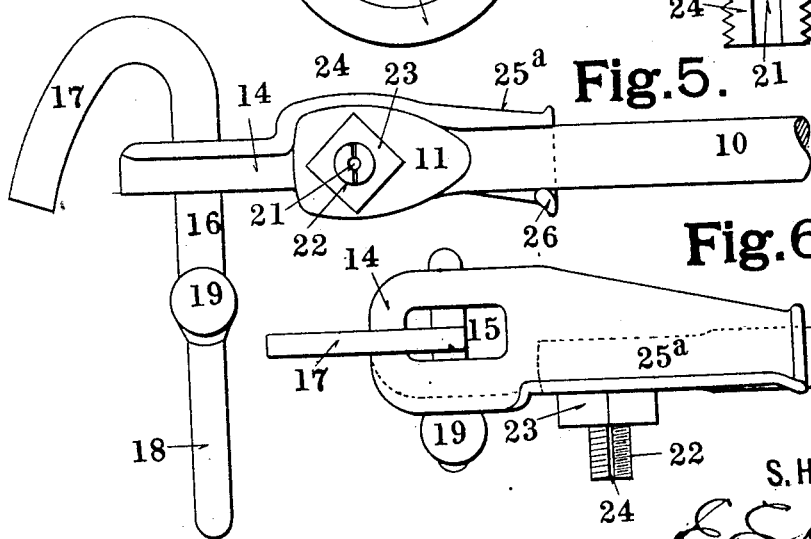
INVENTOR
S. H. CAMPBELL
BY E. E. Huffman
ATTORNEY

UNITED STATES PATENT OFFICE.

STERLING H. CAMPBELL, OF ST. LOUIS, MISSOURI.

ATTACHMENT FOR PIN-LIFTERS.

1,387,684.

Specification of Letters Patent. Patented Aug. 16, 1921.

Application filed October 15, 1919. Serial No. 330,874.

*To all whom it may concern:*

Be it known that I, STERLING H. CAMPBELL, a citizen of the United States of America, residing at the city of St. Louis, State of Missouri, United States of America, have invented a certain new and useful Attachment for Pin-Lifters, of which the following is such a full, clear, and exact description as will enable any one skilled in the art to which it appertains to make and use the same, reference being had to the accompanying drawings, forming part of this specification.

My invention relates to an attachment for pin lifters and has for its object the provision of a simple and effective device which may be secured to the operating rods of pin lifters of the type having a horizontal opening so as to adapt such type of pine lifters for a single link connection with the coupler lock, and also, if so desired, to increase the effective length of the operating rod.

In the accompanying drawings which illustrate two forms of attachment made in accordance with my invention, Figure 1 is a side elevation, Fig. 2 is a top plan view, Fig. 3 is an end view, Fig. 4 is an enlarged section taken on the line 4—4 of Fig. 2 and Figs. 5 and 6 are a side elevation and plan view, respectively, showing a modification.

10 indicates the operating rod of the pin lifter having a flattened end 11 provided with the usual horizontal opening 12. 14 indicates the body of the attachment which is provided with a vertical eye 15 adapted to receive a link 16 for connecting the operating rod with a coupler lock. The link 16 is provided at its upper end with an open loop 17 lying in the plane of the link, and at its lower end with an open loop 18 also lying in the plane of the link but positioned at right angles to the loop 17. The loop 18 is provided with a head 19 for preventing its passage through the eye of the coupler lock. Carried by and preferably formed integral with the attachment is a stud 20 adapted to pass through the horizontal opening 12 in the rod 10. This stud 20 is provided with a central passage 21 and has its outer end 22 threaded to receive a nut 23 for securing the attachment in position on the rod 10. The outer end of the stud 20 is slotted at 24 so that the parts of the end may be slightly spread by inserting a suitable tool in the passage 21 or in the slot 24, thus providing an effective nut lock and at the same time allowing the nut to be removed by means of a suitable wrench without injuring the threads of either the bolt or nut.

In order to prevent rotation of the attachment relative to the rod 10, I provide the inner end of the body 14 with a finger 25 projecting over the top of the rod 10 and a finger 26 projecting below said rod. In this way the rotation of the attachment relative to the rod is prevented so that the loop 17 cannot be detached from the eye when the parts are in position on the car.

In Figs. 5 and 6, I have shown a modification which may be used when it is desired to extend the effective length of the operating rod. In this modification the body 14 having the eye 15 is arranged forward of the end of the rod 10 and the finger 25 is replaced by a flange 25ª bearing on the top of the rod 10 for a considerable distance. The operation is the same as that of the form shown in Figs. 1 to 4.

Having fully described my invention what I claim as new and desire to secure by Letters Patent of the United States is:

1. The combination with an operating rod provided with a horizontal opening, of an attachment carrying an integral stud extending through said opening said attachment being provided with a vertical eye, and means carried by the attachment for engaging with the rod to prevent its pivotal movement relative to the rod.

2. In combination with an operating rod provided with a horizontal opening, a bracket abutting against the rod and extending laterally therefrom and provided with a vertical eye, means extending through the opening of said rod for securing the bracket in position on the rod, and means on the bracket and engaging with the rod for preventing pivotal movement of said bracket with respect to said rod in either direction.

In testimony whereof I have hereunto set my hand and affixed my seal.

STERLING H. CAMPBELL. [L. S.]